United States Patent
Kim

(10) Patent No.: US 10,316,871 B2
(45) Date of Patent: Jun. 11, 2019

(54) DAMPING DEVICE FOR CLUTCH ACTUATING DEVICE

(71) Applicants: Hyundai Motor Company, Seoul (KR); Kia Motors Corporation, Seoul (KR)

(72) Inventor: Eun Sik Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 62 days.

(21) Appl. No.: 15/833,499

(22) Filed: Dec. 6, 2017

(65) Prior Publication Data
US 2019/0128294 A1    May 2, 2019

(30) Foreign Application Priority Data
Nov. 1, 2017 (KR) .................. 10-2017-0144441

(51) Int. Cl.
| F15B 7/00 | (2006.01) |
| F15B 21/00 | (2006.01) |
| F15B 7/06 | (2006.01) |
| F16D 48/02 | (2006.01) |

(52) U.S. Cl.
CPC .............. F15B 21/008 (2013.01); F15B 7/06 (2013.01); F16D 25/14 (2013.01); *F16D 2048/0215* (2013.01); *F16D 2300/22* (2013.01)

(58) Field of Classification Search
CPC ...... F15B 7/04; F15B 7/06; F16D 2048/0215; F16D 25/14
See application file for complete search history.

(56) References Cited

U.S. PATENT DOCUMENTS

| 2,084,368 | A | * | 6/1937 | Wynn | .................. B64D 31/04 251/57 |
| 3,253,518 | A | * | 5/1966 | Duemler | ............... F15B 15/066 74/104 |
| 3,965,798 | A | * | 6/1976 | Estlick | ................... F15B 15/06 91/172 |
| 4,225,110 | A | * | 9/1980 | Akkerman | ............. F15B 15/06 251/229 |
| 5,070,983 | A | * | 12/1991 | Leigh-Monstevens | ..................... F16D 25/14 192/109 F |

(Continued)

FOREIGN PATENT DOCUMENTS

EP    EP 3 050 736 A1    8/2016

*Primary Examiner* — Michael Leslie
(74) *Attorney, Agent, or Firm* — Mintz Levin Cohn Ferris Glovsky and Popeo, P.C.; Peter F. Corless

(57) ABSTRACT

A damping device for a clutch actuating device is provided. The damping device includes a first cylinder that is connected to a master cylinder by a first hydraulic line and a second cylinder that is connected to an actuating cylinder by a second hydraulic line and is disposed at a position adjacent to the first cylinder in parallel. A first piston is disposed in the first cylinder and is moved forward and backward by a fluid pressure in the first cylinder. A second piston is disposed in the second cylinder and is moved forward and backward by a fluid pressure in the second cylinder. A pressure transmitting member is supported to perform a seesaw motion when both sides of the pressure transmitting member are in contact with a pressing portion of the first piston and a pressing portion of the second piston.

8 Claims, 8 Drawing Sheets

(56) References Cited

U.S. PATENT DOCUMENTS

| | | | | |
|---|---|---|---|---|
| 5,320,203 | A * | 6/1994 | Wilber | F16D 25/088 |
| | | | | 192/109 F |
| 6,430,928 | B1 * | 8/2002 | Iyer | F16D 25/12 |
| | | | | 60/592 |
| 6,742,643 | B2 * | 6/2004 | Nix | F16D 25/14 |
| | | | | 192/109 F |
| 6,997,523 | B1 * | 2/2006 | Banoczky | B60T 17/04 |
| | | | | 303/87 |

* cited by examiner

FIG. 5A
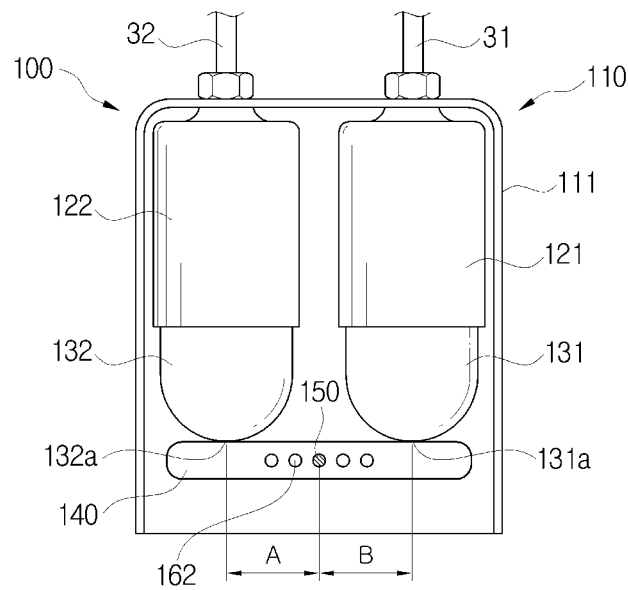
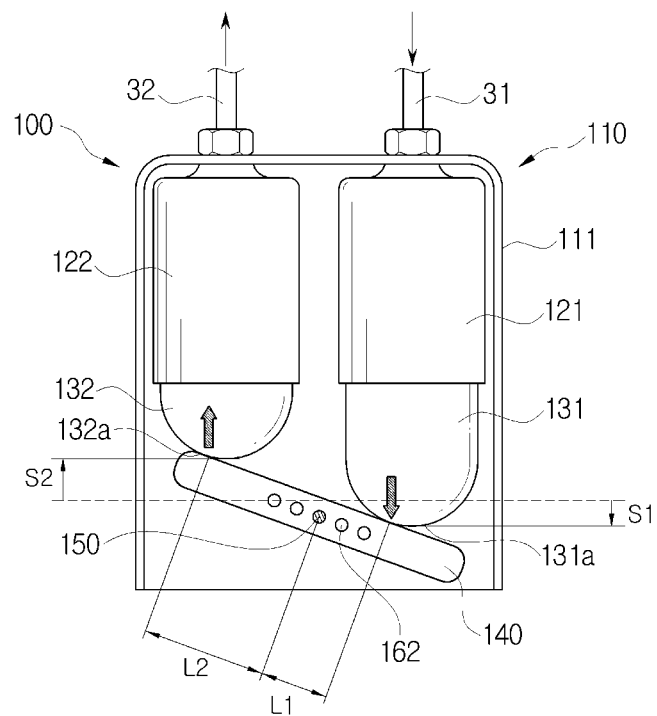
FIG. 5B

FIG. 7A
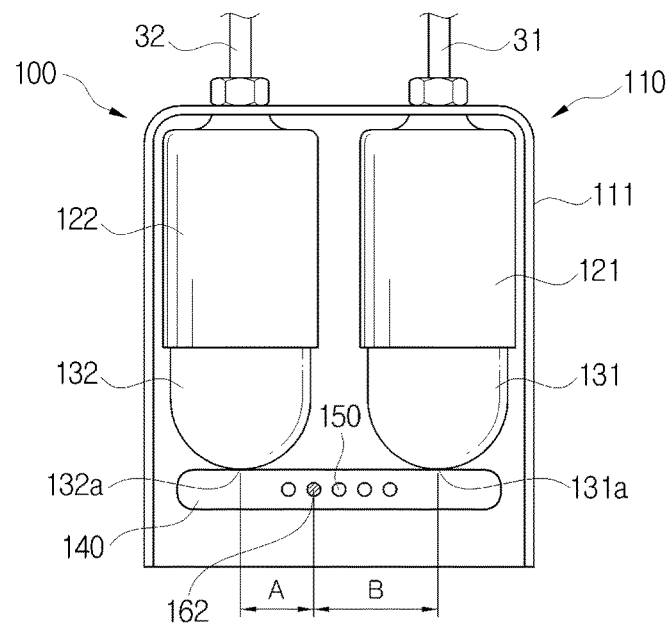
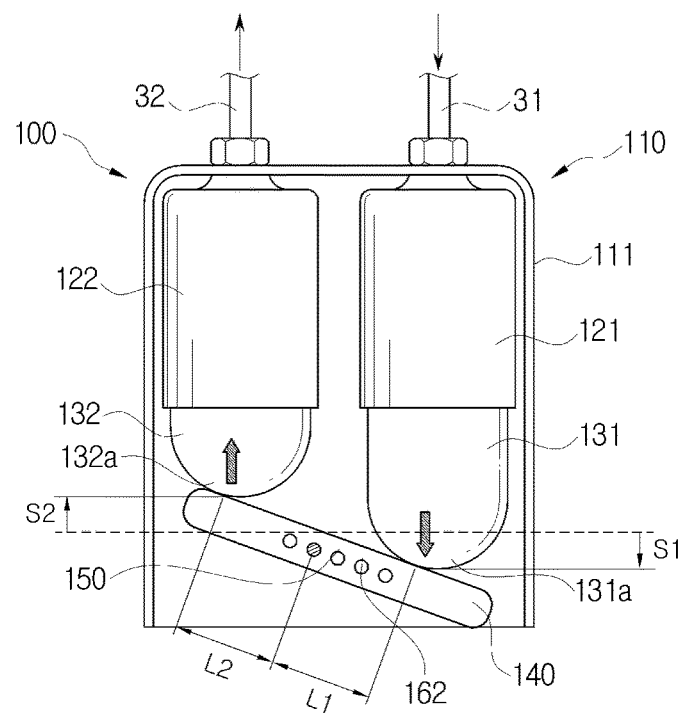
FIG. 7B

DAMPING DEVICE FOR CLUTCH ACTUATING DEVICE

CROSS-REFERENCE TO RELATED APPLICATION

This application claims the benefit of Korean Patent Application No. 10-2017-0144441, filed on Nov. 1, 2017, the disclosure of which is incorporated herein by reference.

BACKGROUND

1. Field of the Disclosure

The present disclosure relates to a damping device for a clutch actuating device, and more particularly, to a damping device capable of reducing vibration transmitted to a clutch pedal and adjusting a pedal force of the clutch pedal.

2. Description of the Related Art

A clutch is installed between an engine of a vehicle and a transmission and operates to transmit or interrupt a rotational force of the engine toward the transmission. A typical clutch actuating device may include a clutch pedal, a master cylinder, an actuating cylinder and an actuating fork. In the clutch actuating device, when a driver engages the clutch pedal, a hydraulic pressure of the master cylinder is transmitted to the actuating cylinder along a hydraulic line, and the actuating cylinder operates the actuating fork connected to the clutch and thus, power transmission by the clutch is interrupted. When the driver releases the clutch pedal, the clutch pedal, the master cylinder, the actuating cylinder, and the actuating fork operate in reverse to allow power to be connected by the clutch.

In a clutch actuating device, the actuating cylinder is installed in a transmission of an engine compartment. Therefore, vibration generated from the engine and the transmission may be transmitted toward a clutch pedal within the vehicle through the hydraulic line of the clutch actuating device. This vibration causes the clutch pedal to shake or make noise, and thus various research is being conducted in the related field to prevent transmission of vibration to the clutch pedal through the hydraulic line.

Conventionally, a regulator is installed in the hydraulic line to attenuate the vibration transmitted toward the clutch pedal, and an anti-vibration unit (AVU) is also installed in the hydraulic line to block off the hydraulic line and to stop transmission of the vibration when a clutch is not being operated. However, the regulator and the AVU are complex in structure and have to be employed together, resulting in an increase in manufacturing cost of the clutch actuating device. Further, since a typical clutch actuating device is required to adjust a pedal force of a clutch pedal differently based on the vehicle type (e.g., gasoline engine vehicle or diesel engine vehicle), it is difficult to use a clutch pedal in a universal manner. Even when a clutch pedal was capable of being used in a universal manner, a structure of the clutch actuating device becomes complex since a device configured to adjust the pedal force has to be provided.

SUMMARY

Therefore, it is an aspect of the present disclosure to provide a damping device for a clutch actuating device capable of reducing vibration transmitted toward a clutch pedal. Also, it is another aspect of the present disclosure to provide a damping device for a clutch actuating device capable of adjusting a pedal force of a clutch pedal. Additional aspects of the disclosure will be set forth in part in the description which follows and, in part, will be obvious from the description, or may be learned by practice of the disclosure.

In accordance with one aspect of the present disclosure, a damping device for a clutch actuating device may include a first cylinder connected to a master cylinder by a first hydraulic line; a second cylinder connected to an actuating cylinder by a second hydraulic line and disposed at a position adjacent to the first cylinder in parallel; a first piston disposed in the first cylinder and configured to be moved forward and backward by a fluid pressure in the first cylinder; a second piston disposed in the second cylinder and configured to be moved forward and backward by a fluid pressure in the second cylinder; and a pressure transmitting member supported to perform a seesaw motion when both sides of the pressure transmitting member are in contact with a pressing portion of the first piston and a pressing portion of the second piston.

The damping device may further include a support pin configured to support the pressure transmitting member and thus, the pressure transmitting member may perform the seesaw motion and may be capable of changing a coupling position. The damping device may be configured to adjust a pedal force of the clutch pedal by adjusting a distance L1 between the support pin and a contact point of the first piston and the pressure transmitting member to be shorter or longer than a distance L2 between the support pin and a contact point of the second piston and the pressure transmitting member. The damping device may further include a housing configured to accommodate the first cylinder, the second cylinder, the first piston, the second piston, and the pressure transmitting member.

The housing may include a body portion formed in a rectangular box shape and having one open side surface and an open bottom surface, in which the first cylinder and the second cylinder may be fixed to an inner surface of the body in parallel with each other, and a cover member configured to cover the open side surface and open bottom surface of the body portion. The pressure transmitting member and the housing may include a plurality of position adjusting apertures configured to change the coupling position of the support pin. The pressing portion of the first piston and the pressing portion of the second piston may have spherical outer surfaces. The pressure transmitting member may be formed in a flat plate shape, and the support pin may be installed in the pressure transmitting member to be changeable in position between the pressing portion of the first piston and the pressing portion of the second piston.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIGS. 5A to 8B respectively illustrate an operation in accordance with a change in a position of a support pin in the damping device for a clutch actuating device according to the exemplary embodiment of the present disclosure.

DETAILED DESCRIPTION

Figure 1:
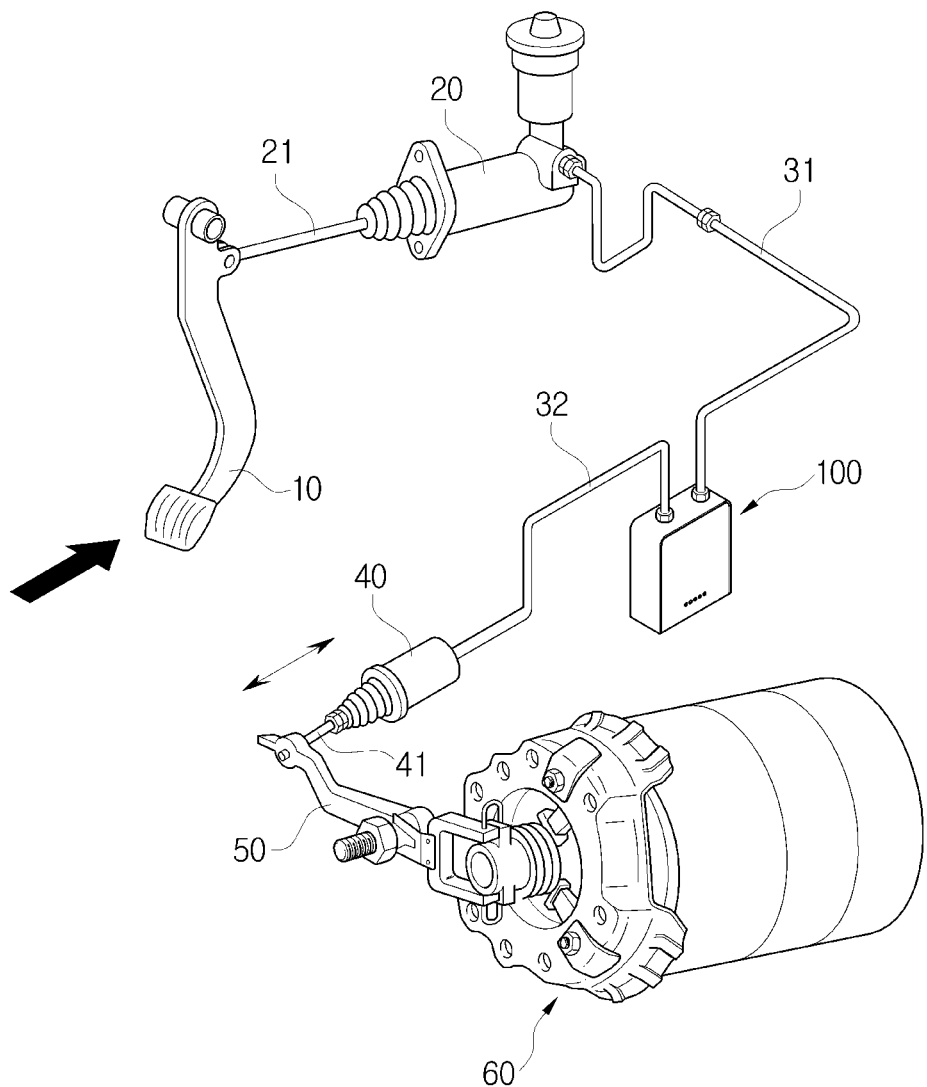
FIG. 1 is a perspective view illustrating a clutch actuating device to which a damping device according to an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. The exemplary embodiments described below are provided as examples to sufficiently transfer the spirits of the invention to those skilled in the art. Accordingly, the present invention is not limited to those exemplary embodiments described below and may be embodied in different forms. In addition, in the drawings, explanatorily irrelevant portions may be omitted to clearly describe the present invention, and the side or the like of an element could be exaggerated for convenience.

FIG. 1 is a perspective view illustrating a clutch actuating device to which a damping device according to an exemplary embodiment of the present disclosure is applied. As illustrated in FIG. 1, the clutch actuating device may include a clutch pedal 10, a master cylinder 20, a first hydraulic line 31, a second hydraulic line 32, an actuating cylinder 40, an actuating fork 50, and a damping device 100.

The clutch pedal 10 may be installed within a vehicle, and the master cylinder 20 may be installed in an engine compartment of the vehicle while connected to the clutch pedal 10 via a push rod 21. The master cylinder 20 may be configured to generate a hydraulic pressure for an operation of a clutch 60 when a driver engages the clutch pedal 10. The clutch 60 may be installed between an engine of the vehicle and a transmission and may connect or disconnect power transmitted from the engine to a transmission by an operation of the actuating fork 50. One side of the actuating fork 50 may extend to an exterior of the clutch 60, and the actuating cylinder 40 may be installed in the transmission while connected to the actuating fork 50 via a push rod 41.

The master cylinder 20 and the actuating cylinder 40 may be interconnected by the first hydraulic line 31, the damping device 100 and the second hydraulic line 32. Therefore, in the clutch actuating device, when the driver engages the clutch pedal 10, the hydraulic pressure of the master cylinder 20 may be transmitted to the actuating cylinder 40 via the first hydraulic line 31, the damping device 100, and the second hydraulic line 32, and the actuating cylinder 40 may be configured to operate the actuating fork 50, and thus power transmission may be blocked by the clutch 60. When the driver releases the engaged clutch pedal 10, the clutch pedal 10, the master cylinder 20, the actuating cylinder 40, and the actuating fork 50 may move in reverse, and thus the power may be connected by the clutch 60.

In particular, the actuating cylinder 40 may be a clutch release cylinder (CRC) type in which the actuating fork 50 operates by receiving the hydraulic pressure of the master cylinder 20. However, a type of the actuating cylinder is not limited thereto. The actuating cylinder of the clutch actuating device may be a hydraulic cylinder in the form of a concentric slave cylinder assembly (CSC). The damping device 100 may connect the first hydraulic line 31 connected to the master cylinder 20 with the second hydraulic line 32 connected to the actuating cylinder 40 and may be configured to reduce vibration transmitted from the engine, the transmission, or the like to a clutch pedal 10 through the second hydraulic line 32.

Figure 2:
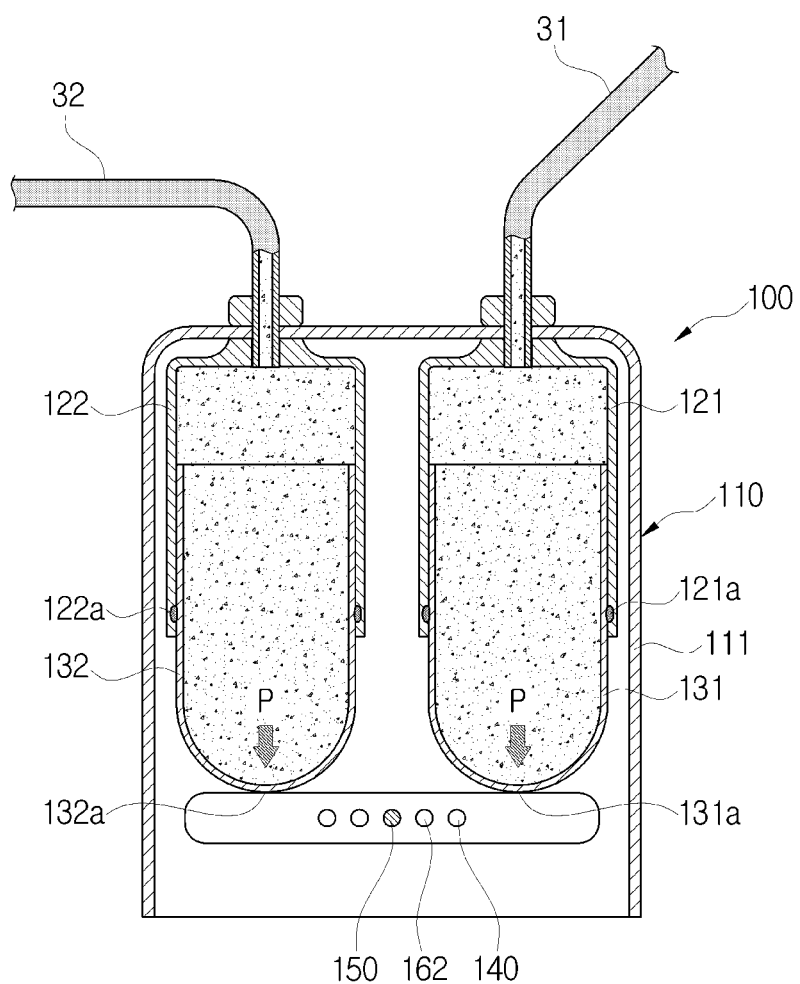
FIG. 2 is a cross-sectional view of the damping device for a clutch actuating device according to the exemplary embodiment of the present disclosure.
Figure 3:
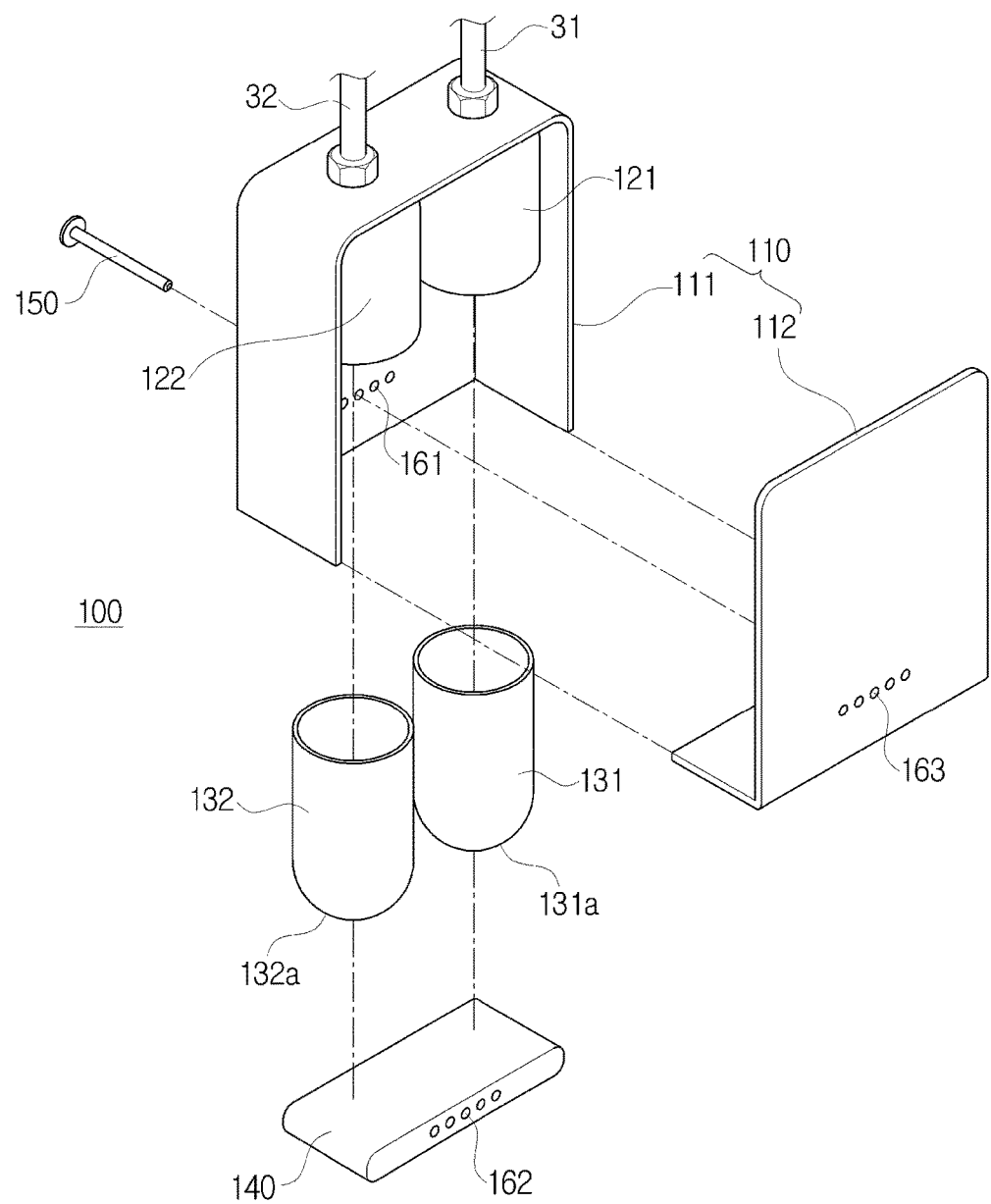
FIG. 3 is a detailed perspective view of the damping device for a clutch actuating device according to the exemplary embodiment of the present disclosure.

FIG. 2 is a cross-sectional view of the damping device according to the exemplary embodiment of the present disclosure, and FIG. 3 is a detailed perspective view of the damping device. Referring to FIGS. 2 and 3, the damping device 100 may include a housing 110, a first cylinder 121, a second cylinder 122, a first piston 131, a second piston 132, a pressure transmitting member 140, and a support pin 150.

Figure 4:
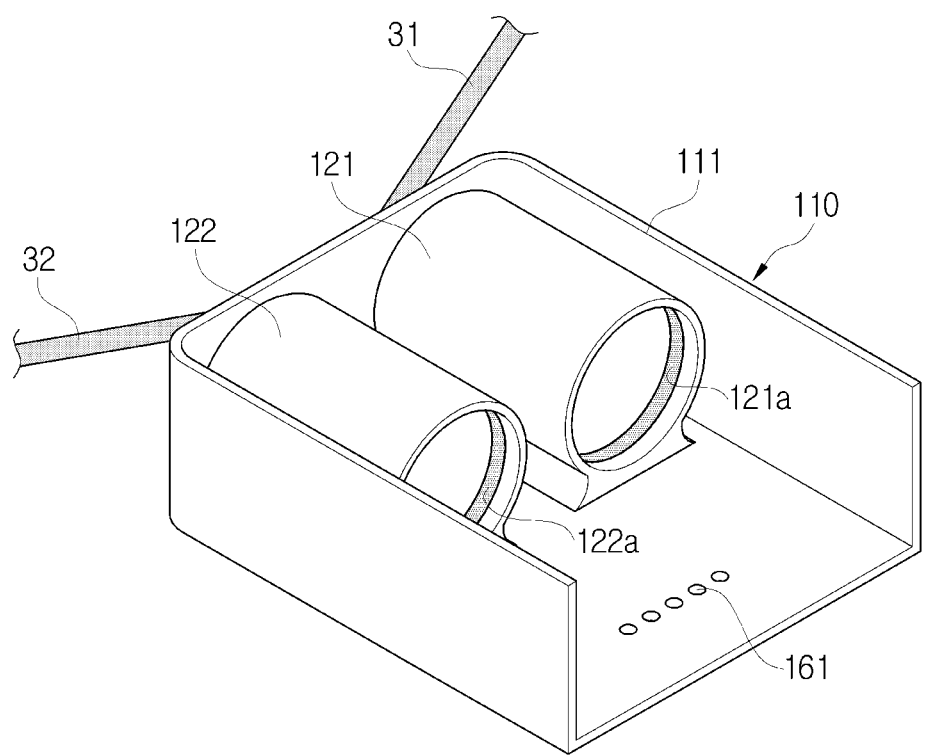
FIG. 4 is a perspective view illustrating a coupling structure between a housing body portion of the damping device for a clutch actuating device and first and second cylinders according to the exemplary embodiment of the present disclosure.

The housing 110 may accommodate the first cylinder 121, the second cylinder 122, the first piston 131, the second piston 132, and the pressure transmitting member 140. The housing 110 may include a body portion 111 formed in a rectangular box shape and having one open side surface and an open bottom surface, and may include a cover member 112 that covers the open side surface and bottom surface of the body portion 111. The first cylinder 121 may be fixed in the body portion 111 of the housing 110 while connected to the first hydraulic line 31, and the second cylinder 122 may be fixed in the body portion 111 of the housing 110 while connected to the second hydraulic line 32. As illustrated in FIGS. 2 and 4, the first cylinder 121 and the second cylinder 122 may be disposed in parallel at positions adjacent to each other, and each side surface of the first cylinder 121 and the second cylinder 122 may be fixed to an inner surface of the body 111.

The first hydraulic line 31 may pass through an upper side of the body portion 111 and may be connected to communicate with an inside of the first cylinder 121, and the second hydraulic line 32 may pass through the upper side of the body portion 111 and may be connected to communicate with an inside of the second cylinder 122. The first piston 131 may be installed in the first cylinder 121 to be movable forward and backward when a lower pressing portion 131a is exposed, and the second piston 132 may also be installed in the second cylinder 122 to be movable forward and backward when a lower pressing portion 132a is exposed.

As illustrated in FIG. 4, a first seal 121a in contact with an outer surface of the first piston 131 to be sealed may be disposed on an inner surface of the first cylinder 121 on an open side, and a second seal 122a in contact with an outer surface of the second piston 132 to be sealed may be disposed on an inner surface of the second cylinder 122 on an open side. Therefore, the first piston 131 may be configured to move forward and backward due to a change of a liquid pressure in the first cylinder 121, and the second piston 132 may move forward and backward due to the liquid pressure fluctuation in the second cylinder 122. In other words, the first piston 131 and the second piston 132 may be configured to move in parallel with each other in the same direction at mutually adjacent positions within the first and second cylinders 121, 122. For example, the pistons may move in and out of the cylinders, respectively.

As illustrated in FIGS. 2 and 3, the pressure transmitting member 140 may be installed in the housing 110 and thus, a seesaw motion may be performed when both sides of an upper surface of the pressure transmitting member 140 are in contact with the pressing portion 131a of the first piston 131 and the pressing portion 132a of the second piston 132. The seesaw motion may refer to an oscillating motion due to the movement of the pistons within the cylinders. The pressure transmitting member 140 may be formed in a flat plate shape, and the support pin 150 may support the pressure transmitting member 140 between the pressing portion 131a of the first piston 131 and the pressing portion 132a of the second piston 131 to allow the seesaw motion to be performed.

An outer surface of each of the pressing portion 131a of the first piston 131 and the pressing portion 132a of the second piston 132 in contact with the pressure transmitting member 140 may be formed in a spherical shape. Therefore, the pressing portion 131a of the first piston 131 and the pressing portion 132a of the second piston 132 may remain in point contact with the upper surface of the pressure transmitting member 140 despite the seesaw motion of the pressure transmitting member 140, and the seesaw motion of the pressure transmitting member 140 may be implemented more smoothly.

For example, as shown in FIG. 5B, when the first piston 131 expands and presses one side (e.g., a first side) of the pressure transmitting member 140, an opposite side (e.g., a second side) of the pressure transmitting member 140 may rise to press the second piston 132 upward, and since the pressing portion 131a of the first piston 131 and the pressing portion 132a of the second piston 132 have spherical surfaces, the seesaw motion of the pressure transmitting member 140 may be performed.

As illustrated in FIG. 3, the support pin 150 may be installed to penetrate the body portion 111 of the housing 110, the pressure transmitting member 140, and the cover member 112 of the housing 110. Accordingly, the pressure transmitting member 140 may be supported and thus, the seesaw motion may be performed within the housing 110. A plurality of position adjusting apertures 161, 162 and 163 may be formed in the pressure transmitting member 140, the body portion 111 of the housing 110, and the cover member 112 of the housing 110 to change a coupling position of the support pins 150. As illustrated in FIGS. 5A-5B and 6A-6B, the position adjusting apertures 161, 162, and 163 may adjust a distance B between the support pin 150 and a contact point of the first piston 131 and the pressure transmitting member 140 and to adjust a distance A between the support pin 150 and a contact point of the second piston 132 and the pressure transmitting member 140 by changing the coupling position of the support pin 150, thereby adjusting a pedal force of the clutch pedal 10.

Referring to FIG. 2, the liquid pressure inside the first cylinder 121 and the liquid pressure inside the second cylinder 122 may be maintained to be substantially equal, and the first piston 131 and the second piston 132 may be maintained to continuously press both sides of the pressure transmitting member 140 with a predetermined pressure. Therefore, since the pressing portion 131a of the first piston 131 and the pressing portion 132a of the second piston 132 may remain in contact with the pressure transmitting member 140 even when the clutch pedal 10 is not engaged, vibration or shaking may be prevented from occurring at the contact portions therebetween.

Furthermore, an operation of the damping device 100 for a clutch actuating device according to the exemplary embodiment of the present invention will be described. FIG. 2 and FIG. 5A illustrate a state in which the clutch pedal 10 is not engaged, and FIG. 5B illustrates a state in which the clutch pedal 10 is engaged. As shown in FIG. 2 and FIG. 5A, when the clutch pedal 10 is disengaged, the first piston 131 and the second piston 132 may press both sides of the pressure transmitting member 140 with about the same pressure, and thus the pressure transmitting member 140 may be maintained to be substantially in parallel with a lower surface of the housing 110.

Further, as shown in FIG. 2 and FIG. 5A, the vibration transmitted from the clutch 60 to the second cylinder 122 of the damping device 100 through the second hydraulic line 32 is primarily attenuated while reaching an expanded space in the second cylinder 122. In other words, the vibration may be transmitted to the expanded space in the second cylinder 122 and thus may be attenuated. Additionally, the vibration attenuated for a first time may be attenuated for a second time while being transmitted from a fluid in the second cylinder 122 to the second piston 132 having a different medium. The vibration attenuated a second time may be attenuated a third time due to a difference in medium and a difference in a vibration transmitting area while being transmitted from the second piston 132 to the pressure transmitting member 140. The vibration attenuated a third time may be attenuated a fourth time while being transmitted from the pressure transmitting member 140 to the first piston 131. The vibration attenuated a fourth time may also be substantially attenuated a fifth time, while being transmitted again from the first piston 131 to the first cylinder 121 having a different medium.

As described above, in the damping device 100 of the exemplary embodiment, the vibration transmitted through the second hydraulic line 32 may be attenuated as the medium and the vibration transmitting area are changed several times from the second cylinder 122 to the first cylinder 121. Since the vibration is removed when reaching the first cylinder 121, the vibration may be prevented from being transmitted to the first hydraulic line 31, and thus, the vibration may be prevented from being transmitted to the clutch pedal 10 side.

As shown in FIG. 5B, when the liquid pressure in the master cylinder 20 is transmitted into the first cylinder 121 through the first hydraulic line 31 by engaging the clutch pedal 10, the first piston 131 may move downward, press one side of the pressure transmitting member 140, and causes the seesaw motion of the pressure transmitting member 140, and the opposite side of the pressure transmitting member 140 may move upward, and presses the pressing portion 132a of the second piston 132 to increase the liquid pressure in the second cylinder 122. Therefore, since the liquid pressure in the second cylinder 122 is transmitted to the actuating cylinder 40 through the second hydraulic line 32, the clutch 60 may be operated (e.g., power transmission shut-off).

As described above, even when the clutch pedal 10 is engaged, the vibration may be transmitted to the damping device 100 through the second hydraulic line 32, and the vibration may be attenuated as the medium and the vibration transmitting area change several times from the second cylinder 122 of the damping device 100 to the first cylinder 121. Therefore, even in this instance, it may be possible to prevent the vibration from being transmitted to the clutch pedal 10.

In addition, as illustrated in FIGS. 5A to 8B, the damping device 100 of the embodiment may be configured to vary the pedal force of the clutch pedal 10 by changing the position of the support pin 150 that supports the pressure transmitting member 140 using the plurality of position adjusting apertures 161, 162 and 163.

In the example shown in FIG. 5A, when the distance B between the support pin 150 and the contact point of the first piston 131 and the pressure transmitting member 140 is equal to the distance A between the support pin 150 and the contact point of the second piston 132 and the pressure transmitting member 140 when the clutch pedal 10 is disengaged. In particular, as illustrated in FIG. 5B, when the clutch pedal 10 is engaged, a distance L1 between the support pin 150 and the contact point of the first piston 131 and the pressure transmitting member 140 becomes shorter than a distance L2 between the support pin 150 and the contact point of the second piston 132 and the pressure transmitting member 140, and a moving distance S2 of the second piston 132 becomes greater than a moving distance S1 of the first piston 131. Therefore, the pedal force of the clutch pedal 10 may be greater than that of the clutch 60.

Figure 6A:
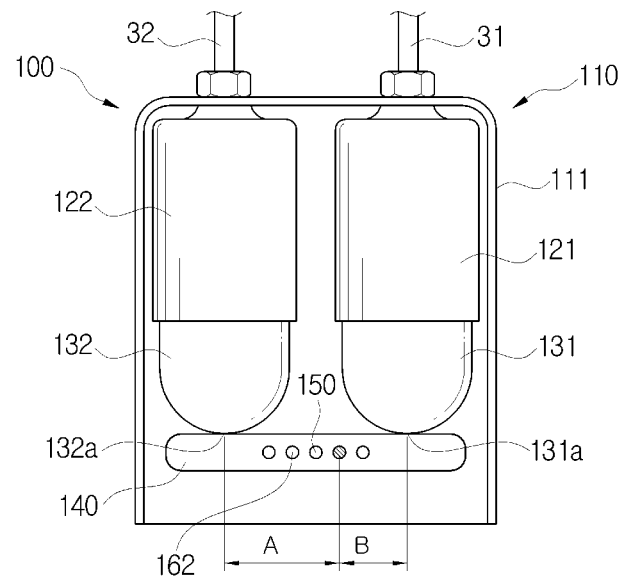
Figure 6B:
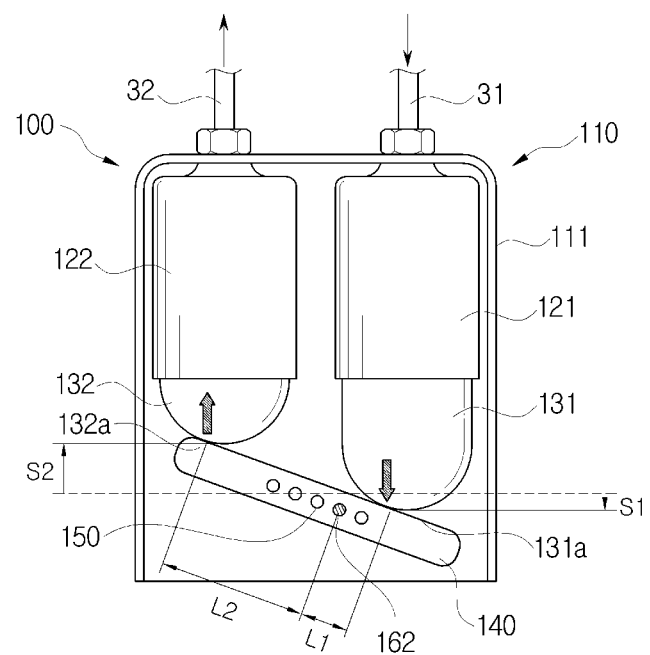

The example of FIG. 6A is a case in which the distance B between the support pin 150 and the contact point of the first piston 131 and the pressure transmitting member 140 is shorter than the distance A between the support pin 150 and the contact point of the second piston 132 and the pressure transmitting member 140 in a state in which the clutch pedal 10 is disengaged. In particular, as illustrated in FIG. 6B, when the clutch pedal 10 is engaged, the distance L1 between the support pin 150 and the contact point of the first piston 131 and the pressure transmitting member 140 becomes shorter than the distance L2 between the support pin 150 and the contact point of the second piston 132 and the pressure transmitting member 140, and the moving distance S2 of the second piston 132 becomes greater than the moving distance S1 of the first piston 131. Therefore, the pedal force of the clutch pedal 10 becomes greater than that in the case of FIGS. 5A-5B.

The example of FIG. 7A is a case in which the distance B between the support pin 150 and the contact point of the first piston 131 and the pressure transmitting member 140 is greater than the distance A between the contact point of the second piston 132 and the pressure transmitting member 140, and the support pin 150 when the clutch pedal 10 is disengaged. In particular, as illustrated in FIG. 7B, when the clutch pedal 10 is engaged, the distance L1 between the support pin 150 and the contact point of the first piston 131 and the pressure transmitting member 140 becomes equal to the distance L2 between the support pin 150 and the contact point of the second piston 132 and the pressure transmitting member 140, and the moving distance S2 of the second piston 132 becomes equal to the moving distance S1 of the first piston 131. Therefore, the pedal force of the clutch pedal 10 may be equal to that of the clutch 60, and the pedal force of the clutch pedal 10 may be further reduced than that in the case of FIGS. 5A-5B.

Figure 8A:
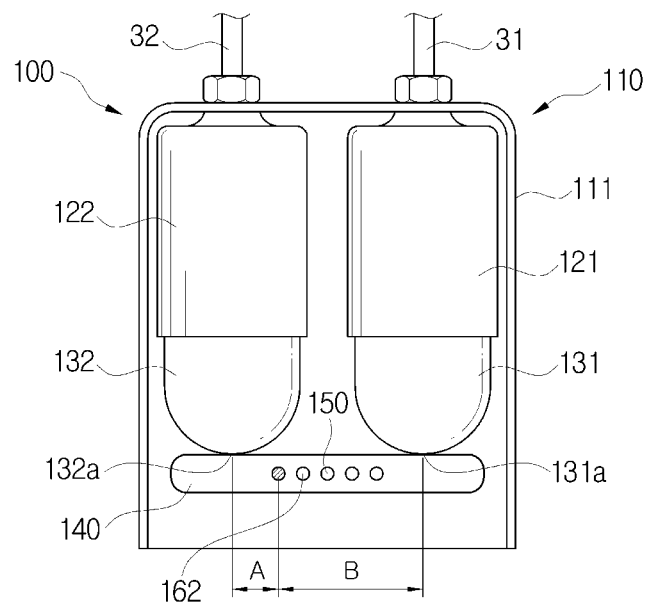
Figure 8B:
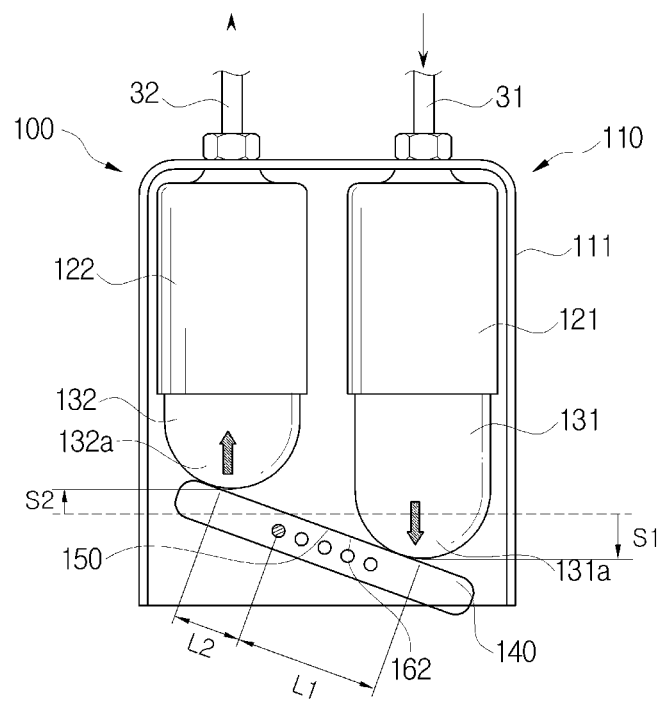

An example of FIG. 8A is a case in which the distance B between the support pin 150 and the contact point of the first piston 131 and the pressure transmitting member 140 is greater than the distance A between the support pin 150 and the contact point of the second piston 132 and the pressure transmitting member 140 when the clutch pedal 10 is disengaged. In other words, FIG. 8A shows a case in which the distance B is greater than that in FIGS. 7A-7B. In particular, as illustrated in FIG. 8B, when the clutch pedal 10 is engaged, the distance L1 between the support pin 150 and the contact point of the first piston 131 and the pressure transmitting member 140 becomes greater than the distance L2 between the support pin 150 and the contact point of the second piston 132 and the pressure transmitting member 140, and the moving distance S1 of the first piston 131 may be increased further than the moving distance S2 of the second piston 132. Therefore, at this time, the pedal force of the clutch pedal 10 may be reduced further than that in the case of FIGS. 7A-7B.

As described above, since the damping device 100 of the present exemplary embodiment is capable of varying the pedal force of the clutch pedal 10 by changing the position of the support pin 150 in addition to attenuating vibration, the clutch pedal 10 may be used in a universal manner even when the vehicle in which the clutch actuating device is mounted changes.

Additionally, in the damping device for a clutch actuating device according to the exemplary embodiment of the present disclosure, since the vibration transmitted to the inside of the second cylinder through the second hydraulic line is attenuated as the medium and the vibration transmitting area are changed several times from the second cylinder to the first cylinder, it may be possible to prevent the vibration of the clutch side from being transmitted to the clutch pedal side. In the damping device for a clutch actuating device of the exemplary embodiment of the present invention, since it may be possible to vary the pedal force of the clutch pedal by changing the position of the support pin, the clutch pedal may be used in a universal manner even when the vehicle in which the clutch actuating device is mounted changes.

Although the technical idea of the present disclosure has been described above with reference to the exemplary embodiments, the scope of the present disclosure is not limited to these exemplary embodiments. It would be appreciated by those skilled in the art that changes may be made in these exemplary embodiments without departing from the principles and spirit of the disclosure, the scope of which is defined in the claims and their equivalents.

What is claimed is:

1. A damping device for a clutch actuating device, comprising:
    a first cylinder connected to a master cylinder by a first hydraulic line;
    a second cylinder connected to an actuating cylinder by a second hydraulic line and disposed at a position adjacent to the first cylinder in parallel;
    a first piston disposed in the first cylinder and configured to be moved forward and backward by a fluid pressure in the first cylinder;
    a second piston disposed in the second cylinder and configured to be moved forward and backward by a fluid pressure in the second cylinder; and
    a pressure transmitting member supported to perform a seesaw motion when both sides of the pressure transmitting member are in contact with a pressing portion of the first piston and a pressing portion of the second piston.

2. The damping device according to claim 1, further comprising:
    a support pin configured to support the pressure transmitting member to cause the pressure transmitting member to perform the seesaw motion and configured to change a coupling position.

3. The damping device according to claim 2, wherein a pedal force of the clutch pedal is adjusted by changing a distance between a contact point of the first piston and the pressure transmitting member to be shorter or longer than a distance between the support pin and a contact point of the second piston and the pressure transmitting member.

4. The damping device according to claim 2, further comprising:
    a housing configured to accommodate the first cylinder, the second cylinder, the first piston, the second piston, and the pressure transmitting member.

5. The damping device according to claim 4, wherein the housing includes:
    a body portion formed in a rectangular box shape and having one open side surface and an open bottom surface, in which the first cylinder and the second cylinder are fixed to an inner surface of the body in parallel with each other; and
    a cover member configured to cover the open side surface and the open bottom surface of the body portion.

6. The damping device according to claim 4, wherein the pressure transmitting member and the housing include a plurality of position adjusting apertures configured to change the coupling position of the support pin.

7. The damping device according to claim 2, wherein the pressure transmitting member is formed in a flat plate shape, and the support pin is disposed in the pressure transmitting member to be changeable in position between the pressing portion of the first piston and the pressing portion of the second piston.

8. The damping device according to claim 1, wherein the pressing portion of the first piston and the pressing portion of the second piston have spherical outer surfaces.

* * * * *